United States Patent [19]

Etzell et al.

[11] Patent Number: 4,546,046

[45] Date of Patent: Oct. 8, 1985

[54] SUBSTRATES WITH FLEXIBLE COATINGS FROM EPSILON-CAPROLACTONE MODIFIED ACRYLICS

[75] Inventors: Roger A. Etzell, Farmington Hills; Bertram J. Miller, Roseville; Dennis J. Dziekan, Farmington Hills, all of Mich.

[73] Assignee: Glasurit America, Inc., Detroit, Mich.

[21] Appl. No.: 726,945

[22] Filed: Apr. 26, 1985

Related U.S. Application Data

[63] Continuation-in-part of Ser. No. 473,868, Mar. 10, 1983, abandoned.

[51] Int. Cl.[4] .................. B05D 1/36; B05D 3/02; B05D 7/16; B32B 15/08
[52] U.S. Cl. .................. 428/460; 427/379; 427/380; 427/385.5; 427/388.3; 427/407.1; 427/409; 427/412.1; 427/419.2; 427/419.3; 427/419.5; 428/463; 428/469; 428/504; 428/505; 428/520; 524/504; 524/505; 524/512; 525/450; 525/518
[58] Field of Search .................. 427/379, 380, 407.1, 427/409, 419.2, 419.3, 419.5, 385.5, 412.1, 388.3; 428/460, 463, 469, 504, 505, 520

[56] References Cited

U.S. PATENT DOCUMENTS

| | | | |
|---|---|---|---|
| 4,082,816 | 4/1978 | Fisk et al. | 260/855 |
| 4,220,679 | 9/1980 | Backhouse | 427/401 |
| 4,290,932 | 9/1981 | Wright et al. | 260/29.6 |
| 4,340,511 | 7/1982 | Backhouse et al. | 524/504 |

OTHER PUBLICATIONS

PPG Information Bulletins, Durethane ®, Del-32906 and DEM-32797.
J. Oil Col. Chem. Assoc. (1981) vol. 64, pp. 398-404, B. E. Bailey et al., "Caprolactone in Surface Coatings".
J. of Polymer Science: Polymer Chemistry Ed., vol. 20 (1982) pp. 319-326, A. Schindler et al., "Alcohol-Initiated Polymerizations of E-Caprolactone".
J. of Coatings Technology, vol. 54, No. 693, 10/82, pp. 77-81, A. N. Theodore et al., "Modification of Acrylic Polymers etc.".
R. H. Young et al., "Ring Opening Polymerizations: on the Mechanism of Polymerization of E-Caprolactone," pp. 57-64.
Union Carbide, "Epsilon-Caprolactone" pp. 3-11.
Union Carbide, "Tone TM M-100 Monomer".
Cook Technical Data Sheet, "Acrylic Flo-Control Resin".
Shell Chem. Co. Tech. Bulletin, "Epon ® Resin 828.
Eastman, "Cellulose Acetate Butyrate" CAB 551-0.2.
Alcoa Aluminum, "Alcoa 7574".
Columbia Chemicals Co., "Conductex ® 975".
Photostabilizers for Coatings, "Tinvuin 328".
Glidden, "Silicron".
Asbury Graphite Mills, Inc. "Micro #470" Graphite.
Cymel "303" Cross-Linking Agent.
King Industries, Inc., Ivacure ® X49-110 Blocked Catalyst.
Exxon, "Petroleum Solvents".
Cyanamid, "Surfactants".
Celanese, "Formcel".

Primary Examiner—James C. Cannon
Attorney, Agent, or Firm—Wells & Wells

[57] ABSTRACT

Flexible coatings are applied to the outer surfaces of automotive vehicles having metal and plastic portions from coating compositions having about 40 to 95% by weight of an epsilon-caprolactone modified acrylic polymer and about 5 to 45% by weight of an aminoplast resin cross-linking agent, the epsilon-caprolactone modified acrylic polymer having a number average molecular weight of about 1,000 to 6,000, hydroxyl contents from about 1 to 7% by weight, optionally about 0.1 to 4.0% by weight carboxyl contents and about 0.25 to 6 moles epsilon-caprolactone per mole of hydroxyl and/or carboxyl in the polymer, the coating composition having a solids content of about 35 to 68% by weight and a liquid carrier of about 32 to 65% by weight.

35 Claims, No Drawings

SUBSTRATES WITH FLEXIBLE COATINGS FROM EPSILON-CAPROLACTONE MODIFIED ACRYLICS

This application is a continuation-in-part of application Ser. No. 473,868, filed Mar. 10, 1983, and now abandoned.

BACKGROUND OF THE INVENTION

The field of the invention is methods of applying flexible coatings to substrates, the improved coating compositions used, and the coated articles resulting therefrom. More particularly, the invention is concerned with the curing of thermosetting epsilon-caprolactone modified acrylic polymers and aminoplast cross-linking agents based coating compositions on flexible as well as rigid substrates such as automotive vehicle exteriors.

Changes in the automotive industry have resulted in the use of many new materials in the manufacturing of automobile parts. The properties of these materials place new demands on the coating compositions used to protect them and make them aesthetically appealing. Automobiles of the 1980's have some flexible plastic parts in the areas of the front and rear bumpers to prevent damage from minor bumps. These parts require paints that are extremely flexible over a wide range of temperatures, durable to weathering, and aesthetically pleasing. The prior art coating compositions for these flexible parts are based upon high molecular weight polyester-urethane polymers cured with aminoplast resins. These thermoset polyester-urethanes exhibit excellent initial flexibility, but the flexibility deteriorates rapidly when the coated article is exposed to even normal weathering. Because the most suitable polyester-urethanes are very high in molecular weight, these polymers are unsuitable for high solids, solvent-borne coatings.

The state of the art of these polyester-urethane polymers is illustrated by the DURETHANE ® coating compositions of PPG as illustrated in their Information Bulletins for DEL-32 906, and DEM-32 797, the disclosures of which are incorporated herein.

The state of the art of epsilon-caprolactone modified acrylic polymers and aminoplast cross-linking agent based coating compositions may be ascertained by reference to U.S. Pat. No. 4,082,816, of Fisk et al, the article by B. E. Bailey et al entitled "Caprolactone in Surface Coatings", as reported in the Journal of the Oil Colour Chemistry Association (1981), Volume 64, at pages 398–404, the article by A. Schindler et al entitled "Alcohol-Initiated Polymerization of Epsilon-Caprolactone" in the Journal of Polymer Science: Polymer Chemistry Edition, Volume 20 (1982) at pages 319–326, and the article by A. N. Theodore et al entitled "Modification of Acrylic Polymers etc." in the Journal of Coatings Technology, Volume 54, No. 693, 10/82, pages 77–81, the disclosures of which are incorporated herein.

Acrylic microgel resins are useful in the present invention and the state of this technology may be ascertained by reference to U.S. Pat. Nos. 4,220,679; 4,290,932, and 4,340,511, the disclosures of which are incorporated herein.

SUMMARY OF THE INVENTION

Having in mind the limitations of the prior art it is an object of the present invention to provide flexible coatings for rigid and flexible substrates and continuous substrates having plastic and metal sections as used on the exterior surfaces of automobile bodies.

Another object of the invention is the compositions required to provide the flexible coatings.

Still another object of the present invention is the multiple coating of flexible and rigid substrates with clear coats wet-on-wet over the flexible coatings.

Yet another object of the present invention is primers for the flexible and rigid substrates over which the multiple flexible coatings are applied.

A further object of the present invention is the coating of flexible and rigid substrates with a conductive primer followed by application of the flexible multiple coatings.

These objects of the present invention are achieved by the use of coating compositions where thermosetting solution acrylic resins are modified with epsilon-caprolactone to get high solids caprolactone modified acrylic polymers. The caprolactone modified acrylic polymers are then mixed with appropriate aminoplast resins, pigments, solvents, additives, and acid catalysts to make high solids coating compositions.

The following coating compositions are prepared:
(a) metallic paint compositions;
(b) straight shade paint compositions without metal pigments;
(c) basecoat paint compositions;
(d) unpigmented clear coat paint compositions to be applied wet-on-wet over the basecoats;
(e) conductive primers; and
(f) non-conductive primers.

These paint compositions produce flexible coatings for use over the exterior plastic and metal parts of automobile bodies. The coatings are spray painted with standard types of application equipment and are baked at standard automobile bake temperatures.

DESCRIPTION OF THE PREFERRED EMBODIMENTS

The use of these thermosetting epsilon-caprolactone modified acrylic polymers of the present invention offers a means of obtaining coatings having improved solids content and durability characteristics. Moreover, the present invention provides a novel pigmented coating composition for flexible as well as rigid automobile body parts. The flexible parts can be coated with the same base coat as the entire rigid exterior of the automobile body. Before baking, a flexible clear coating can be applied to the flexible parts and a rigid clear coating can be applied to the rigid parts. Previously known flexible basecoat compositions and flexible clearcoat compositions were not compatible with the rigid clearcoat compositions. This complication required one of several special processing techniques. The prior art required that different basecoat compositions be used for the rigid and flexible parts. To prevent the intermixing of spray droplets, these parts would be sprayed in separate locations. The rigid parts and the flexible parts could then be clearcoated wet-on-wet with rigid and flexible clears respectively. Since different basecoat compositions are used in different locations in the prior art, it is very difficult to get good clear matches. Another option of the prior art is that the same basecoat composition could be used for the rigid as well as the flexible parts, but since the clearcoat compositions are not compatible, the parts still must be clearcoated separately. The flexible coatings of the present invention can be spray painted adjacent to normal rigid acrylic melamine clearcoats by employing commonly known paint formulating techniques.

A specially formulated clear for the flexible parts and a specially formulated clear for the rigid parts will give the optimum paint performance for both areas of the vehicle. On the other hand, it is possible to formulate a coating with epsilon-caprolactone modified acrylic polymers that has enough flexibility for the flexible parts and still be an excellent coating for the rigid parts. This would allow the automotive manufacturer much greater freedom when painting the car body. Fewer paints would be required in the factory and a reduced number of spray stations and equipment would be required to apply the coating.

Moreover, the present invention provides novel coatings for substrates which upon curing provide improved flexibility over flexible substrates after exposure to weathering. Another unique advantage of the epsilon-caprolactone modified acrylic resins of the present invention is that high solids coating compositions can be made without any significant loss of durability.

The thermosetting coating compositions of the present invention are prepared from an epsilon-caprolactone modified acrylic polymer, an aminoplast cross-linking polymer, volatile organic solvents, and in some instances, a cellulose acetate butyrate resin, an acid catalyst, a microgel resin, U. V. absorbers, and uniformly dispersed pigments. The preferred method of depositing the film is by utilizing spraying techniques. The basic binder system is pigmented and made into several types of coatings. Optionally, metallic pigments, such as aluminum, copper, bronze, and the like, can be added in such quantities along with other conventional opaque and transparent pigments that a metallic or straight shade color effect is obtained. The coating compositions are applied normally in a dry film thickness of 0.8 to 2.2 mils. However, the levels of pigment can be adjusted so that a basecoat, dry film thickness of 0.4 to 1.5 mils, is applied. A clear coating of 0.8 to 2.5 mils can then be used over the basecoat. The pigmentation can be selected so that a primer coating can be produced.

By controlling the pigmentation with additions of conductive pigments, the dry film can be either conductive or non-conductive .

These coated substrates, after a short flash of 1 to 5 minutes, are baked at between about 82°–193° C. for an appropriate amount of time to get a hardened coating, usually 20 to 40 minutes. Coatings based upon these epsilon-caprolactone polymers require considerably shorter flash times than current polyester-urethanes before baking. The epsilon-caprolactone polymer based coatings also tolerate a wider baking temperature range before a deterioration in flexibility and weathering test results is observed.

Another important unexpected advantage of the coating compositions based upon the epsilon-caprolactone modified acrylics of the present invention is the good adhesion obtained when the articles are repaired or recoated. Current polyester-urethane aminoplastic cured coated articles require sanding before they can be recoated or poor intercoat adhesion is obtained. Articles coated with the epsilon-caprolactone based compositions of the present invention require no special preparation before a repair coat is applied.

These flexible coating compositions of the present invention have binders or film-forming solid constituents of at least 35% by weight. Generally, the composition has a film forming solids content of about 35–68% at application viscosity.

The remainder of the constituents in the composition is a liquid carrier which generally is a solvent for the binder. In addition, the composition optionally contains about 0.5–150% by weight, based on the weight of the binder, of pigment.

The binders or film-forming constituents used in the coating compositions comprise about 40–95% by weight of an epsilon-caprolactone modified acrylic polymer and about 5–45% by weight of an aminoplast resin cross-linking agent. For most uses, the composition contains about 65–75% by weight of epsilon-caprolactone modified acrylic polymer and 25–35% by weight of aminoplast resin cross-linking agent. In addition, the composition optionally contains 0.5–35% by weight of an acrylic microgel resin and optionally 1.0 to 10% of a cellulose acetate butyrate resin.

The epsilon-caprolactone modified acrylic polymer can be prepared by a variety of solution polymerization methods in which the monomers are blended with a solvent, optionally a free radical polymerization catalyst, optionally epsilon-caprolactone, optionally epsilon-caprolactone modified monomer, optionally a polymerization catalyst for the epsilon-caprolactone, and optionally a chain transfer agent, and heated to 75° to 165° C. for two to eight hours to form a polymer. When the epsilon-caprolactone is not included in this process, it is added to the preformed acrylic polymer along with an optional polymerization catalyst for the epsilon-caprolactone and heated to 75° to 165° C. for 2 to 8 hours to form a polymer. These epsilon-caprolactone modified polymers have number average molecular weights from about 1,000 to 6,000, hydroxyl contents from about 1 to 7% by weight, optionally carboxyl contents from about 0.1 to 4.0% by weight, and epsilon-caprolactone mols of about 0.25 to 6 per mole to hydroxy and/or carboxyl in the mixture being polymerized.

SOLVENTS

Typical solvents which are used to prepare the epsilon-caprolactone modified acrylic polymer are the following: toluene, ethyl acetate, acetone, methyl isobutyl ketone, methyl ethyl ketone, methyl amyl ketone, mineral spirits, ethylene glycol monoether acetates and other aliphatic, cycloaliphatic and aromatic hydrocarbons, esters, ethers, ketones, and other compatible solvents are conveniently used. Special care is exercised when functional solvents are desired. Acid, alcohol and amine functional solvents have the potential of reacting with epsilon-caprolactone, and therefore should not be introduced until the epsilon-caprolactone has been reacted with the desired site on the acrylic polymer.

MONOMERS

The epsilon-caprolactone modified acrylic polymer is composed of epsilon-caprolactone and at least two types of ethylenically unsaturated monomers. A portion of the ethylenically unsaturated monomer structure contains a carboxyl and/or hydroxyl group or other group containing an active hydrogen capable of reacting with the epsilon-caprolactone monomer. Examples of such hydroxyl containing ethylenically unsaturated monomers are hydroxyalkyl acrylates and hydroxyalkyl methacrylates such as: 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, and 4-hydroxybutyl methacrylate. Examples of such carboxyl containing ethylenically unsaturated monomers are: acrylic acid, methacrylic acid, itaconic acid, maleic acid, fumaric acid, and crotonic acid. Typically, the remainder of the ethylenically unsaturated monomers containing no carboxyl, hydroxyl groups or other active hydrogen groups, are alkyl methacrylates and acrylates such as: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, propyl acrylate, phenyl acrylate, isobornyl acrylate and the like, or other constituents such as styrene or substituted styrene, such as methyl styrene, acrylonitrile, and methacrylonitrile.

The preferred concentrations of the monomeric materials of the present invention in parts by weight are as follows:

|  | By Weight | |
| --- | --- | --- |
|  | Preferred | Much Preferred |
| Carboxyl functional monomers | 0.2–9 | 0.2–4 |
| Hydroxyl functional monomers | 1.0–48 | 10–30 |
| Other monomers - Not having hydroxyl or carboxyl groups | The remainder ~25–85 | The remainder ~25–75 |
| Epsilon-Caprolactone monomer | 5–55 | 15–50 |

FREE RADICAL INITIATOR

The polymerization is preferably carried out in the presence of a free radical polymerization catalyst, typically, tertiary butyl perbenzoate, tertiary butyl peroctoate, cumene hydroperoxide, benzoyl peroxide, di-tertiary butylperoxide, di-cumene peroxide, methyl ethyl ketone peroxide or similar peroxygen compounds, or an azo compound such as azobisisobutyronitrile is employed. The amount of free radical polymerization catalyst can be varied depending upon the desired molecular weight but about 1 to 6% by weight is typical. A mixture of two or more initiators may be used.

EPSILON-CAPROLACTONE CATALYST

In addition to the free radical polymerization catalyst, the polymerization medium could include a polymerization catalyst when epsilon-caprolactone monomer is used in the composition.

Typically this epsilon-caprolactone catalyst may be an alkali or alkaline earth metal alkoxide, e.g. sodium or calcium methoxide; aluminum isopropoxide, tetraalkyl titanates, titanium chelates and acylates, lead salts and lead oxides, zinc borate, antimony oxide, stannous octoate, organic acids, inorganic acids such as sulfuric, hydrochloric, and phosphoric, and Lewis acids such as boron trifluoride.

CHAIN TRANSFER AGENT

Optionally, a chain transfer agent is used to control the length of the epsilon-caprolactone modified acrylic polymer backbone. The most typical chain transfer agents are sulfur compounds such as: dodecyl mercaptan, 2-mercapto ethanol, butyl mercaptan, n-octyl mercaptan, and the like. The chain transfer agent is used at about 0.5 to 6% level by weight on solid polymer.

POLYMERIZATION METHODS

The polymerization may be carried out in a conventional manner, utilizing heat and/or catalysts and varying solvents and techniques.

Several different processing methods can be used to prepare epsilon-caprolactone modified acrylic polymers. The main differences involve the specific point where the epsilon-caprolactone is introduced into the reaction process.

In one method, the epsilon-caprolactone is charged to the reactor along with the organic solvents. These materials are heated to reaction temperature and the ethylenically unsaturated monomers are added and reacted in the presence of the solvent and the epsilon-caprolactone. When the catalyst for the polymerization of the epsilon-caprolactone is added after the ethylenically unsaturated monomers have been added to the flask, then much of the epsilon-caprolactone merely functions as a solvent during the free radical polymerization of the ethylenically unsaturated monomers. This process leads to extremely low viscosity epsilon-caprolactone modified acrylic resins, suitable for high solids type coating compositions.

An optional polymerization method is that described in detail in Examples 1, 2, 4, 5, and 6, of U.S. Pat. No. 4,082,816. The epsilon-caprolactone is added to the reaction vessel along with the ethylenically unsaturated monomers. Even in this process, the epsilon-caprolactone functions as a solvent when it doesn't instantaneously react with the hydroxyl or carboxyl groups. The rate at which epsilon-caprolactone reacts can be controlled by temperature and catalyst.

Another common method of incorporating the epsilon-caprolactone is to add the ethylenically unsaturated monomers to the reaction vessel and essentially complete the free radical initiated portion of the polymerization before the epsilon-caprolactone is introduced. This method is described in Example 3 of U.S. Pat. No. 4,082,816.

Still another polymerization method useful in the present invention is to pre-react epsilon-caprolactone with the carboxyl or hydroxyl functional ethylenically unsaturated monomer to form a new difunctional monomer with an ethylenically unsaturated double bond and a pendant hydroxyl or carboxyl group. The molar ratio of epsilon-caprolactone to ethylenically unsaturated carboxyl or hydroxyl monomer can range from 0.1 to 20 but more preferably from 0.25 to 6. A typical example of such a monomer is TONE M-100 ®, a product of Union Carbide which is a reaction product of one mole of 2-hydroxyethyl acrylate with 2 moles of epsilon-caprolactone.

This acrylate-epsilon-caprolactone kind of special epsilon-caprolactone extended ethylenically unsaturated monomer can be substituted for the epsilon-caprolactone monomer and the appropriate hydroxyl or carboxyl functional monomer in the polymer composition. In this polymerization method as well as the method where the epsilon-caprolactone is added after the free radical polymerization, the epsilon-caprolactone doesn't function as a solvent for the free radical polymerization, therefore, with all other factors equal these procedures produce somewhat higher molecular weight polymer.

AMINOPLAST

The aminoplast resins used as cross-linkers for the polymer are aldehyde condensation products of melamine, urea, benzoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine or urea are the most common and are preferred, but products of other amines and amides in which at least one amine group is present can also be employed.

For example, such condensation products can be produced from triazines, diazines, triazoles, guanidines, guanamines, and alkyl and aryl-substituted derivatives of such compounds, including alkyl-substituted, aryl-substituted and cyclic ureas, and alkyl and aryl-substituted melamines. Some examples of such compounds are N,N'-dimethyl urea, benzylurea, N,N'-ethyleneurea, diazine, diamide, formoguanamine, benzoguanamine, ammeline, 2-chloro-4,6-diamino-1,3,5-triazine, 3,5-diaminotriazole, 4,6-diaminopyrimidine, 2,4,6-triphenyltriamino-1,3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially a monohydric alcohol, although the preferred alcohols are methanol, butanol, and similar lower alkanols.

The resin can be monomeric or polymeric. One preferred resin which gives a high quality finish is hexamethoxymethyl melamine, especially for high solids paints.

One typical resin of the preferred type is "Cymel" 303. Another useful resin is a methoxy/butoxymethyl melamine.

CELLULOSE ACETATE BUTYRATE

Optionally, in addition to the above film-forming constituents, about 1–10% by weight, based on the weight of the film-forming constituents of the composition, of cellulose acetate butyrate can be used in the composition. Cellulose acetate butyrate that has a butyryl content of about 25–60% by weight and a viscosity of about 0.01–2 seconds measured according to ASTM-D-1343-56 at 25° C. can be utilized.

MICROGEL

Another useful type of film-forming polymer that can be used in the coating compositions of the present invention is an acrylic microgel. These can be prepared by methods outlined in U.S. Pat. No. 4,290,932. Typically, these microgels are prepared by polymerizing a mixture of ethylenically unsaturated monomers at least one of which is difunctional in ethylenic type unsaturation, and at least one of which contains a polar group (for example a carboxy or hydroxy group) in an aqueous emulsion.

The microparticles so prepared then are transferred into the non-polar organic medium of the coating composition. Care must be taken to prevent the polar groups from re-orienting themselves in the microparticle inner part, as in such an eventuality the microparticles become ineffective in the sense of the present invention. A high degree of cross-linking of the particles by means of polyfunctional monomers prevents this re-orientation of the polar groups when transferring the microparticles into an organic, non-polar medium whereby polar groups are also present in the coating composition on the surface of the microparticles.

Because of the polar groups, there are interactions between the microparticles and a spatial lattice is formed. The interactions for instance may be due to dipole-dipole forces or hydrogen bridge bonds. Due to the interactions, a loose spatial lattice is formed between the particles in the coating substance, which can be reversibly dismantled by shearing forces. The loose lattice, i.e., a gel structure, renders the coating composition structurally viscous or thixotropic. These microparticles unexpectedly prevent pigment settling, improve pattern control, help obtain good film builds and greatly reduce the sagging tendency of high solids type compositions which are based on low molecular weight resins.

The microgel particles may be merely added to the thermosetting composition without the need for elaborate conditions. In a preferred embodiment, the microgel particles are added to the polymer solution by merely blending the non-aqueous dispersion in which the microgel particles are formed with the solution.

ACID CATALYST

An acid catalyst solution can be added to the composition to increase the rate of cross-linking of the composition on curing. Generally, about 0.1–3% by weight, based on the weight of the film-forming constituents, of acid catalyst is used. For example, phosphoric acid or an alkyl acid phosphate can be utilized for this purpose. Typical alkyl acid phosphates are methyl acid phosphate, ethyl acid phosphate, propyl acid phosphate, lauryl acid phosphate, butyl acid phosphate, phenyl acid phosphate, 2-ethyl hexyl acid phosphate, and the like.

Sulfonic acid or a substituted sulfonic acid can be used such as para-toluene sulfonic acid, methane sulfonic acid, dinonylnaphthalene sulfonic acid, dinonylnaphthalene disulfonic acid, dodecylbenzene sulfonic acid and the like. Maleic acid or alkyl acid maleates can be used such as butyl acid maleate, ethyl acid maleate, and the like.

Additionally, the catalytic action may be supplied by the incorporation of free acid groups in the film-forming polymer, for example, by the use of acrylic acid or methacrylic acid as a comonomer in the preparation of an acrylic polymer.

BLOCKED ACID CATALYST

The acid catalysts used in the present invention may be blocked with amines, or epoxies so as to improve the shelf stability of the completed paint formula. Amines such as triethylamine, diethylamine, diethylethanol amines, pyridine and the like may be used. Epoxies such as glycidyl ester of versatic acid and Epon 828 ®, a trademark of Shell, and the like may be used. These blocking agents neutralize the acid until the baking process takes place. At that time, the blocking agent is released and the acid functions as a catalyst to the cross-linking reaction.

U.V. STABILIZER

To protect the coated article from premature degradation due to the U.V. light portion of sun light about 0.5–5% by weight, based on the weight of the film-forming material, of an ultraviolet light stabilizer is used in topcoat formulations.

Typical ultraviolet light stabilizers that are useful in this invention are as follows:

Benzophenones such as dodecyl oxibenzophenone, 2,4-dihydroxybenzophenone, hydroxybenzophenones containing sulfonic groups, 2,4-dihydroxy-3',5'-ditertiary butyl benzophenone, 2,2', 4'-trihydroxy benzophenone esters of dicarboxylic acids, 2-hydroxy-4-acryloxyethoxybenzophenone, aliphatic mono esters of 2,2', 4'-trihydroxy-4'-alkoxybenzophenone; 2-hydroxy-4-methoxy-2'-carboxybenzophenone.

Triazoles such as 2-phenyl-4-(2', 4'-dihydroxybenzoyl)triazoles, substituted benzotriazoles such as hydroxy-phenyl-triazoles such as 2-(2'-hydroxy-5'-methyl phenyl)benzotriazole, 2-(2'-hydroxy-phenyl)-benzotriazole, 2-(2 '-hydroxy-5'-octylphenyl) naphthotriazole.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and such triazines containing sulfonic acid groups, aryl 1,3,5 triazines, orthohydroxyl aryl-s-triazone.

Benzoates such as dibenzoate of diphenylol propane, tertiary butyl benzoate of diphenylol propane, nonyl phenyl benzoate, octyl phenyl benzoate, resorcinol dibenzoate.

Other ultraviolet light stabilizers include lower alkyl thiomethylene containing phenols, substituted benzenes such as 1,3-bis-(2'-hydroxybenzoyl) benzene, metal derivatives of 3,5-di-t-butyl-4-hydroxyphenyl proprionic acid, asymmetrical oxalic acid diarylamides, alkylhydroxyphenyl-thioalkanoic acid esters, dialkylhydroxyphenyl alkanoic acid esters of di and tri pentaerythritol, phenyl and naphthalene substituted oxalic acid diamides, methyl beta-(3,5-di-tert-butyl-4-hydroxyphenyl)proprionate, α,α'-bis-(2-hydroxyphenol)-di-isopropyl-benzenes, 3,5'-dibromo-2'-hydroxy acetophenone, ester derivatives of 4,4-bis(4'-hydroxyphenyl)pentanoic acid wherein there is at least one unsubstituted position ortho to the aromatic hydroxyl groups, organophosphorus sulfides such as bis(diphenyl phosphinothioyl)monosulfide and bis(diphenyl phosphinothioyl)disulfide, 4-benzoyl-6-(dialkyl-hydroxy-benzyl)resorcinol, bis(3-hydroxy-4-benzoyl-phenoxy)diphenyl silane, bis (3-hydroxy-4-benzoylphenoxy) dialkyl silane, 1,8-naphthalimides, α-cyano, β,β-diphenylacrylic acid derivatives, bis-(2-benzoxazolyl)alkanes, bis(2-naphthoxazolyl)alkanes, methylene malonitriles containing aryl and heterocyclic substitutes, alkylene-bis-dithiocarbanate, 4-benzoyl-3-hydroxy phenoxyethyl acrylate, 4-benzoyl-3-hydroxyphenoxy ethyl methacrylate, aryl or alkyl substituted acrylonitriles, 3-methyl-5-isopropylphenyl-6-hydroxy coumarone.

In addition to the U.V. stabilizer, hindered amine light stabilizers and antioxidants can be used. The U.V. stabilizer molecules are designed to absorb the U.V. light and dissipate the energy whereas the hindered amine light stabilizer and the antioxidants are designed to terminate free radicals which have been generated in the paint films by the U.V. light. The termination of the free radicals limits the amount of film degradation that takes place.

Typical antioxidants are as follows: tetrakis alkylene(-di-alkyl hydroxy aryl)alkyl ester alkanes such as tetrakis methylene 3(3', 5'-dibutyl-4'-hydroxyphenyl)proprionate methane, reaction product of p-amino diphenylamine and glycidyl methacrylate, reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilino phenyl) acrylamide, N-(4-anilinophenyl) meleamic acid N-(4-anilinophenyl) maleimide, alkylhydroxyphenyl groups bonded through carboalkoxy linkages to nitrogen atom of a heterocyclic nucleus containing an imidodicarbonyl group or an inidodithiocarbonyl group, 3,5-di-tert. butyl-4-hydroxy cinnamonitrile, ethyl-3,5-di-tert. hexyl-4-hydroxycinnamide, substituted benzyl esters of β-(substituted hydroxy phenyl)propionic acids, bis-(hydroxyphenyl alkylene)alkyl isocyanurate compounds, tetrakis hydroxy benzyl phosphonium halides alone or in combination with a dialkylthiodialkanoate, thiodimethylidyne tetrakisphenols alone or in combination with a dialkyl thiodialkanoate or phosphite or phosphonate, dihydrocarbyl-hydroxy phenyl aryl or alkyl phosphonites or phosphonates or phosphates or phosphites or phosphinates or phosphinites or phosphorothionates or phosphinothionates, diphenyl bis-(3,5-di-tert.-butyl-4-hydroxyphenoxy)silane, hydrocarbyl-hydroxyphenyl-dihydrocarbyldithiocarbamates such as 3,5-di-tert.-butyl-4-hydroxy phenyl dimethyldithio carbamate and amino benzyl thioether.

PIGMENTS

The compositions of the present invention frequently contain pigments which improve the protective and decorative effect of the coatings. The term pigment herein means colored and hueless, organic and inorganic pigments, filler or dyestuffs which are soluble or insoluble in solvents or vehicles. Especially as regards automobile enameling, metallic pigments have for some time been widely used. Metallic pigments offer a varying reflection on incident light as a function of the angle of observation. This effect is frequently called the "Flip-Flop" effect and depends on the orientation of the flake-like metallic pigments in the finished coating.

The pigment particles included in the compositions may range in size from about 0.1 to 100 microns and may be of any of the pigments conventionally used in surface coating compositions, including inorganic pigments such as titanium dioxide, iron oxide, chromium oxide, lead chromate and carbon black and organic pigments such as phthalocyanine blue and phthalocyanine green, carbazole violet, anthrapyrimidine yellow, flavanthrone yellow, isoindoline yellow, indanthrone blue, quinacridone violet and perylene reds. For the present purposes, the term "pigment" is here meant to embrace also conventional fillers and extenders, such as talc or kaolin.

Suitable metallic pigments include in particular aluminum flake and copper bronze flake, which are intended for the production of "glamour metallic" finishes.

In general, pigments of any kind may be incorporated in compositions in an amount of from about 0.5% to 150% of the aggregate weight of the film-forming polymer and the microparticles. Where metallic pigmentation is employed, this is preferably in an amount of from 2 to 20% by weight of the aforesaid aggregate weight. Electrically conductive pigments range from about 10 to 40% by weight.

Such pigments, whether metallic or otherwise, may be incorporated into the compositions with the aid of known dispersants. Thus, the main film-forming polymer may be employed as pigment dispersant:. Any such polymeric dispersant is also considered to be part of the film-forming constituent.

REDUCTION SOLVENTS

The viscosity of the compositions can be adjusted by adding solvents, if necessary. Generally, the composition is utilized at as high a solids content as the application conditions will allow to keep air pollution at a minimum level.

Examples of the volatile solvents and diluents which can be used in formulating the coating compositions of the invention are toluene, xylene, butyl acetate, acetone, methyl isobutyl ketone, butyl alcohol, and other aliphatic, cycloaliphatic and aromatic hydrocarbons, esters, ethers, ketones, and alcohols, such as are conventionally used in coating compositions. The criteria of the selection of the solvent is that it will not react with the film-forming material, can readily be removed in the application and curing process among other desirable properties. The amount of solvent is controlled to provide the coating composition with the ability of the coating to flow or level out to a smooth surface to provide an acceptable application.

TYPES OF COATINGS

The different components of the compositions of the present invention can be combined in such a manner that a large number of composition variations are obtained. For example, the pigmentation can be selected so that the composition can be used as a primer for the flexible parts of an automobile. The pigmentation can also be selected so that the composition can be used as a topcoat, either uniform in color or containing a quantity of metallic flake pigment. This composition is again suitable for the flexible parts. Another example is more highly pigmented so-called basecoat. These basecoats are designed to be coated over wet-on-wet with clear non-pigmented compositions. The basecoat can be uniform in color or can contain metallic flake pigments. The basecoat is covered over and protected by a clearcoat, and it can be universally used on flexible as well as rigid substrates. The clearcoating of the basecoats can be handled in two different manners. The clearcoat for the flexible can be made from a highly flexible composition and the clearcoat for the rigid substrates of the car can be made from a hard-rigid composition. Alternately, the clearcoat composition can be chosen so that the flexibility is great enough for the plastic parts and still suitable for rigid substrates.

SUBSTRATES

The coating compositions of the present invention can be applied over a variety of substrates, but the ones of most current interest for automobile bodies are ferrous and non-ferrous metals and rigid as well as flexible plastic materials such as thermoplastic polyurethane, thermoplastic olefins, thermoset polyurethane, and ethylene propylene terpolymer. These plastic materials may be reinforced with various fibers such as glass.

APPLICATION

The coating compositions advantageously are applied with spraying equipment. The equipment may use air to atomize the paint or the newer rotating disk or bell. Optionally, the paint may be transferred more efficiently to the substrate if an electrostatic charge is placed on the paint droplets.

The coatings are applied at various film thicknesses depending upon the type of coating. Primers for flexible substrates are generally about 0.6 to 1.0 mils thick. Single topcoats for flexible substrates preferably are about 0.8–2.2 mils thick. Basecoats for flexible as well as rigid substrates are about 0.4–1.5 mil thick. The clearcoat on flexible as well as rigid substrates is about 0.8–2.5 mils thick.

Typical spray apparatus useful in the present invention include the following:

(a) Bink's model #62—siphon feed, air atomized spray gun;
(b) Ransburg REA III—air atomized, electrostatic spray gun;
(c) Behr Bell—rotationallly atomized, electrostatic spray machine; and
(d) Behr Esta—air atomized, electrostatic spray gun.

BAKING

These coatings are baked at a variety of temperatures from as low as 82° C. for 20 minutes to as high as 193° C. for 30 minutes when suitable acid catalyst levels are used. The heat resistance of the flexible or rigid parts may limit the upper baking temperature. Currently used flexible automobile exterior parts will be distorted if baked above 129° C.

The following specific examples further illustrate the applications of the present invention but the invention is not limited to these specific examples. The concentrations are listed in parts by weight unless otherwise indicated.

EXAMPLES 1-6

Solution acrylic resins are prepared from the formulations given below:

TABLE 1

| Reaction Mixture | EXAMPLES | | | | | |
|---|---|---|---|---|---|---|
| | 1 | 2 | 3 | 4 | 5 | 6 |
| Portion 1 | | | | | | |
| Methyl Amyl Ketone | 23.20 | 48.50 | — | 38.00 | 38.00 | 36.50 |
| Ethylene Glycol Monoethyl-ether Acetate | — | — | 26.80 | — | — | — |
| Cumene Hydro-peroxide | 1.20 | 0.50 | 0.50 | 0.50 | 0.50 | 1.00 |
| Portion 2 | | | | | | |
| Styrene | 18.90 | 12.40 | 18.89 | 4.70 | 6.40 | 5.85 |
| Butyl Methacrylate | 14.70 | 26.20 | 17.49 | — | — | 19.30 |
| Butyl Acrylate | — | — | 14.68 | — | — | 11.70 |
| 2 Ethyl-hexyl Acrylate | 12.81 | — | — | 35.90 | 37.50 | — |
| Hydroxypropyl Methacrylate | 21.00 | — | 17.49 | — | 14.90 | — |
| Hydroxy- | — | 9.90 | — | 17.90 | — | 20.48 |

TABLE 1-continued

| Reaction Mixture | EXAMPLES | | | | | |
|---|---|---|---|---|---|---|
| | 1 | 2 | 3 | 4 | 5 | 6 |
| ethyl Acrylate | | | | | | |
| Acrylic Acid | 2.59 | 1.50 | 1.40 | 1.50 | 1.20 | 1.17 |
| Cumene Hydroperoxide | 5.60 | — | 2.35 | — | — | 4.00 |
| Di-tert. Butyl Peroxide | — | 1.00 | — | 1.50 | 1.50 | — |
| Portion 3 | | | | | | |
| Di-tert. Butyl Peroxide | — | — | .20 | — | — | — |
| Ethylene Glycol Monoethylether Acetate | — | — | .20 | — | — | — |
| Total Formulated Mixture | 100.00 | 100.00 | 100.00 | 100.00 | 100.00 | 100.00 |
| Reduction | | | | | | |
| Normal Butyl Alcohol | none | none | 14.78 | none | none | none |
| Solvent Removal by Vacuum Distillation | | | | | | |
| Methyl Amyl Ketone | none | −16.67 | none | none | none | −10.50 |
| Total Final Product | 100.00 | 83.33 | 114.78 | 100.00 | 100.00 | 89.50 |
| Properties | | | | | | |
| Viscosity (Gardner-Holdt) | Z | J | U-V | J-K | F | U |
| % Non-Volatile | 70.2 | 60.3 | 60.5 | 62.5 | 61.0 | 66.8 |
| Acid Number | 35.4 | 27.7 | 25.1 | 22.1 | 22.5 | 18.8 |

Portion 1 is added to a four neck flask, equipped with a thermometer, addition funnel, agitator, reflux condenser, inert gas inlet and heating mantle and heated to reflux at about 155° C.±3° C. Portion 2 is mixed until homogeneous and charged to the addition funnel. At reflux, Portion 2 is added evenly and continuously to the flask over four (4) hours. In Example 3, portion 3 is mixed and added to the flask immediately after portion 2 has been completely added.

The above reaction mixture is held at 155° C.±3° C. for four hours. Examples 1, 4, and 5, are then cooled. Example 3 is reduced as indicated in Table 1. Examples 2 and 6 undergo solvent removal by vacuum distillation as indicated in Table 1. The resulting products are characterized by the properties recorded in Table 1.

EXAMPLES 7-9

The following solution acrylic resins which contain epsilon-caprolactone illustrate a procedure in which epsilon-caprolactone is present, in the flask, from the beginning of the reaction. They are prepared from the formulations given below.

TABLE 2

| Reaction Mixture | EXAMPLES | | |
|---|---|---|---|
| | 7 | 8 | 9 |
| Portion 1 | | | |
| Methyl Amyl Ketone | 38.70 | 18.90 | 38.00 |
| Cumene Hydroperoxide | 0.50 | 0.50 | 0.50 |
| Epsilon-Caprolactone | 23.70 | 31.80 | 27.00 |
| Portion 2 | | | |
| Styrene | 5.92 | 8.00 | 6.00 |
| Methyl Methacrylate | — | 8.00 | 6.00 |
| Butyl Methacrylate | 4.74 | 18.30 | 7.80 |
| 2 Ethylhexyl Acrylate | 11.85 | — | — |
| Hydroxyethyl Acrylate | 11.85 | 11.90 | 12.00 |
| Acrylic Acid | 1.19 | 1.60 | 1.20 |
| Cumene Hydroperoxide | — | 0.50 | — |
| Di-tert. Butyl Peroxide | 1.00 | — | 1.50 |
| Portion 3 | | | |
| Methyl Amyl Ketone | 0.50 | 0.45 | — |
| Stannous Octoate | 0.05 | 0.05 | — |
| Total Final Product | 100.00 | 100.00 | 100.00 |
| Properties | | | |
| Viscosity (Gardner-Holdt) | C | F-G | C-D |
| % Non-Volatile | 60.9 | 58.3 | 62.4 |
| Acid Number | 19.9 | 19.5 | 18.1 |

Portion 1 of Examples 7 to 9 is added to a four neck flask equipped with a thermometer, agitator, reflux condenser, addition funnel, inert gas inlet and heating mantle and is heated to reflux at 155° C.±3° C. Portion 2 is stirred until homogeneous and charged to the addition funnel. At reflux, portion 2 is added evenly and continuously to the flask over four (4) hours. In Examples 7 and 8, Portion 3 is then added over fifteen (15) minutes after Portion 2 has been added. The above reaction mixtures are held at 155° C.±3° C. for four hours and cooled. The final products are characterized by the properties recorded in Table 2.

EXAMPLES 10-13

The following solution acrylic resins which contain epsilon-caprolactone, illustrate a procedure in which the epsilon-caprolactone is introduced into the reaction, with the monomers. They are prepared from the formulations given below.

TABLE 3

| Reaction Mixture | EXAMPLES | | | |
|---|---|---|---|---|
| | 10 | 11 | 12 | 13 |
| Portion 1 | | | | |
| Methyl Amyl Ketone | 24.50 | — | — | 37.45 |
| Xylene | — | 37.45 | — | — |
| Aromatic 100 Solvent* | — | — | 37.45 | — |
| Cumene Hydroperoxide | 0.50 | 0.50 | 0.50 | 0.50 |
| Portion 2 | | | | |
| Styrene | — | 6.00 | 6.00 | 6.00 |
| Methyl Methacrylate | — | 6.00 | 6.00 | 6.00 |
| Butyl Methacrylate | 14.90 | 7.80 | 7.80 | 7.80 |
| 2 Ethylhexyl Acrylate | 17.10 | — | — | — |
| Hydroxyethyl Acrylate | 11.20 | 12.00 | 12.00 | 12.00 |
| Acrylic Acid | 1.50 | 1.20 | 1.20 | 1.20 |
| Epsilon-Caprolactone | 29.80 | 27.00 | 27.00 | 27.00 |
| Cumene Hydroperoxide | 0.50 | — | — | — |
| Di-tert. Butyl Peroxide | — | 1.50 | 1.50 | 1.50 |
| Portion 3 | | | | |
| Methyl Amyl Ketone | — | — | — | 0.50 |
| Xylene | — | 0.50 | — | — |
| Aromatic 100 Solvent* | — | — | 0.50 | — |
| Stannous Octoate | — | 0.05 | 0.05 | 0.05 |
| Total Formulated Mixture | 100.00 | 100.00 | 100.00 | 100.00 |
| Reduction | | | | |
| Normal Butyl Alcohol | +7.14 | none | none | none |
| Total Final Product | 107.14 | 100.00 | 100.00 | 100.00 |
| Properties | | | | |
| Viscosity (Gardner-Holdt) | I | O | H-I | E-F |
| % Non-Volatile | 72.3 | 61.2 | 61.5 | 61.0 |
| Acid Number | 18.0 | 17.2 | 14.3 | 23.0 |

*Registered Trademark of EXXON

Portion 1 of Examples 10 to 13 is added to a four neck flask, equipped with a thermometer, addition funnel, agitator, reflux condenser, inert gas inlet and heating mantle, and heated to reflux at about 155° C.±3° C. for Examples 10, 12 and 13, and at about 143° C.±3° C. for Example 11. Portion 2 is mixed until homogeneous and charged to the addition funnel. At reflux, Portion 2 is added, evenly and continuously to the flask over four (4) hours. In Examples 11, 12, and 13, Portion 3 is mixed and added over fifteen (15) minutes after Portion 2 has been added. The above reaction mixtures are then held at reflux at 155° C.±3° C. for Examples 10, 12 and 13, and 143° C.±3° C. for Example 11 for four hours. Examples 11, 12 and 13 are then cooled. Example 10 is reduced as indicated in Table 3. The resulting products are characterized by the properties recorded in Table 3.

EXAMPLES 14–16

Epsilon-caprolactone modified acrylic monomers are prepared from the formulations given below:

|  | Monomer I | Monomer II |
|---|---|---|
| Hydroxyethyl Acrylate | 27.25 | 30.75 |
| Epsilon-caprolactone | 72.68 | 69.18 |
| Stannous Octoate | .05 | .05 |
| Hydroquinone Monomethyl Ether | .02 | .02 |
| Total Parts by Weight | 100.00 | 100.00 |
| Viscosity (Gardner-Holdt) | D-E | C |

All materials are added to a three neck flask, equipped with a thermometer, agitator, reflux condenser, air inlet and heating mantle. The mixture is heated to 120° C.±3° C. and held at this temperature until the reaction is complete. The new epsilon-caprolcatone monomer is cooled and used as a monomer raw material in the following examples.

Monomer I has a molar ratio of epsilon-caprolactone to hydroxyethyl acrylate of 2.7 to 1.0 and Monomer II has a molar ratio of 2.3 to 1.0.

Epsilon-caprolactone modified acrylic resins are prepared from the formulations given below:

TABLE 4

|  | EXAMPLES | | |
|---|---|---|---|
|  | 14 | 15 | 16 |
| Portion 1 | | | |
| Methyl Amyl Ketone | 23.50 | 37.42 | 37.42 |
| Cumene Hydroperoxide | 0.50 | 1.00 | 1.00 |
| Portion 2 | | | |
| Styrene | 7.45 | 5.91 | 5.91 |
| Butyl Methacrylate | 17.14 | 7.68 | 7.68 |
| Methyl Methacrylate | 7.45 | 5.91 | 5.91 |
| Acrylic Acid | 1.49 | 1.18 | 1.18 |
| Epsilon-Caprolactone - Modified Monomer I | 40.97 | — | — |
| Modified Monomer II | — | 38.42 | — |
| Modified Monomer III | — | — | 38.42 |
| Cumene Hydroperoxide | 1.50 | — | — |
| Di-tert. Butyl Peroxide | — | 2.48 | 2.48 |
| Totals | 100.00 | 100.00 | 100.00 |
| Viscosity (Gardner-Holdt) | Z-Z-1 | G-H | G-H |
| % Non-Volatile | 74.8 | 62.0 | 62.1 |
| Acid Number | 24.0 | 16.1 | 20.8 |

Portion 1 in Examples 14 to 16 is added to a four neck flask, equipped with a thermometer, addition funnel, agitator, reflux condenser, inert gas inlet and heating mantle and heated to reflux at about 155° C.±3° C. Portion 2 is mixed until homogeneous and charged to the addition funnel. At reflux, Portion 2 is added evenly and continuously to the flask over four (4) hours. Epsilon-caprolactone modified Monomer III is TONE M-100 Monomer (a trademark of Union Carbide) obtained from Union Carbide Corporation. This material is very similar to Monomer I and II, TONE M-100 is a reaction product of epsilon-caprolacton and hydroxyethyl acrylate in a ratio of about 2.0 to 1.0. Examples 14, 15 and 16, are held at reflux for 3–4 hours before cooling. The final product is characterized by the properties recorded in Table 4.

EXAMPLE 17

A solution acrylic resin, which illustrates post addition of epsilon-caprolactone, is prepared from the formulation given below:

TABLE 5

| Reaction Mixture | Example 17 |
|---|---|
| Portion 1 | |
| Methyl Amyl Ketone | 36.95 |
| Cumene Hydroperoxide | 0.50 |
| Portion 2 | |
| Methyl Amyl Ketone | 0.50 |
| Styrene | 6.00 |
| Methyl Methacrylate | 6.00 |
| Butyl Methacrylate | 7.80 |
| Hydroxyethyl Acrylate | 12.00 |
| Acrylic Acid | 1.20 |
| Di-tert. Butyl Peroxide | 1.50 |
| Portion 3 | |
| Methyl Amyl Ketone | 0.50 |
| Stannous Octoate | 0.05 |
| Epsilon-Caprolactone | 27.00 |
| Total Final Product | 100.00 |
| Properties | |
| Viscosity (Gardner-Holdt) | H-I |
| % Non-Volatile | 63.3 |
| Acid Number | 24.0 |

Portion 1 of Example 17 is added to a four neck flask, equipped with a thermometer, agitator, reflux condenser, addition funnel, inert gas inlet, and heating mantle and heated to reflux at 150° C.±3° C. Portion 2 is stirred until homogeneously and charged to the addition funnel. At reflux, Portion 2 is added evenly and continuously over four (4) hours. The reaction mixture comprising Portion 1 and Portion 2 is held at 150° C.±3° C. for three hours. Portion 3 is then added and the resulting reaction mixture is held at 150° C.±3° C. for four (4) hours. It is then cooled and the final product is characterized by the properties recorded in Table 5.

| MICROGEL | EXAMPLE 18 EMULSION PREPARATION |
|---|---|
| 50.925 | Deionized Water (1st) |
| .600 | Aerosol MA-80* (1st) |
| 10.500 | 1,6-Hexanediol Diacrylate |
| 2.100 | Hydroxypropyl Methacrylate |
| 8.400 | Methyl Methacrylate |
| .600 | Aerosol 22** |
| .250 | Aerosol MA-80* (2nd) |
| 24.000 | Deionized Water (2nd) |
| 2.375 | Deionized Water (3rd) |
| .250 | Ammonium Persulfate |

*Sodium dihexyl sulfosuccinate (American Cyanamid)
**Tetrasodium N—(1,2-dicarboxy-ethyl)-N—octadecyl sulfosuccinate (American Cyanamid)

To a five liter, four neck reaction flask equipped with a condenser, thermometer, agitator, large dropping funnel equipped with an agitator, small dropping funnel, inert gas inlet and a heating mantle, the first deionized water and Aerosol MA-80 are charged. The third deionized water and ammonium persulfate are premixed and added to a small dropping funnel. The 1,6-hexanediol diacrylate, hydroxypropyl methacrylate, methyl methacrylate, Aerosol 22, second Aerosol MA-80 and second deionized water are premixed and charged to the large dropping funnel equipped with an agitator. This mixture of monomers, water and surfactant, called a pre-emulsion, is held under constant agitation. The Aerosol MA-80 and deionized water are heated to 81° C.±2° C. at which time 10% of the ammonium persulfate solution is added. The pre-emulsion of acrylic monomers is added continuously over two (2) hours and the remaining ammonium persulfate solution is added continuously over 2½ hours. The temperature of the reaction is held at 81° C.±2° C. throughout, thirty minutes after the ammonium persulfate solution is added, the emulsion is cooled to room temperature and discharged. The physical characteristics of this resin are 21.2 non-volatiles, 10 seconds on the number 4 Ford Cup viscometer and 8.5 acid number.

| ACRYLIC MICROGEL RESIN PREPARATION | |
|---|---|
| | Mixture A |
| 58.937 | Microgel Emulsion |
| 18.270 | n-Butanol |
| | Mixture B |
| 0.589 | n-Butanol |
| 17.687 | Methyl Amyl Ketone |
| | Mixture C |
| 1.118 | Styrene |
| 1.195 | Butyl Methacrylate |
| 0.868 | 2-Ethylhexyl Acrylate |
| 0.868 | Hydroxypropyl Methacrylate |
| 0.079 | Acrylic Acid |
| 0.389 | tertiary Butyl Peroctoate |

In a separatory funnel, equipped with an agitator, the microgel emulsion and first n-butanol are charged. They are vigorously agitated for five minutes and then allowed to separate into the organic layer and water n-butanol layer. The water n-butanol layer is discarded and the organic layer is rinsed from the separatory funnel with mixture B and charged to a five liter reaction flask. The reaction flask is equipped with a condenser, Barret trap, thermometer, dropping funnel and agitator. The mixture under agitation is heated to reflux, at about 96° C. Mixture C is then added to the reactor over one hour. Water is removed from the flask through the trap until the reaction temperature is 115° C. The mixture is then cooled and filtered. The resulting acrylic microgel dispersion exhibits the following characteristics:

| Non-volatiles | 31.1 |
|---|---|
| Acid Number | 10.9 |
| Viscosity | 12 seconds #4 Ford Cup |
| Color | White. |

EXAMPLE 19

A butylated melamine formaldehyde resin is prepared from the formulation given below:

| Melamine (triamino triazine) | 16.41 |
|---|---|
| Butyl Formcel (This commercially available preparation consists of 40.0% formaldehyde, 53.0% normal butanol, 7% water) | 45.52 |
| Normal Butanol | 37.54 |
| Xylene | 0.50 |
| Phthallic Anhydride | 0.03 |
| | 100.00 |

The above materials are charged to a four neck flask, equipped with a thermometer, agitator, reflux condenser, distilling receiver, inert gas inlet and heating mantle.

The mixture is heated under agitation and an inert gas blanket until all raw materials have dissolved and the reacting mixture is refluxing at 100° C.±3° C. Water is then removed by azeotropic distillation into the distilling receiver. About 8 parts of water are removed as a by-product of the reaction. The reaction mixture is held at reflux until an ASTM tolerance value of 40–45 is obtained by titration of ten (10) grams of the reaction mixture with an ASTM solvent blend which is 84% isooctane, 8% decahydronaphthalene, and 8% toluene as described in ASTM D-1198-73, entitled "Standard Test Method for Solvent Tolerance of Amine Resins".

The reaction mixture then undergoes solvent removal by vacuum distillation until 48.8 parts of solvent are removed.

It is then reduced with 12.4 parts of Xylene and 16.0 parts of normal butanol. The final product has a viscosity of Y at 60.2 non-volatile, an ASTM value of 38.7, and an acid number of 0.4.

EXAMPLES A–L

Paint Preparation, Application, and Evaluation

White Enamels

White pigmented coatings are prepared using the ingredients listed in Table 6 (formulations B–L) which are at application viscosity (17"–20"-#4 Ford Cup at 80° F.).

The acrylic resin, white mill paste, flow additive, and melamine resin are blended together with thorough agitation on a high speed mixer. Added to the above ingredients with rapid agitation is the microgel resin—Example 18.

The blocked acid catalyst is preblended with the indicated amounts of ethanol and n-butanol, and added with rapid agitation to the accumulated ingredients.

The U.V. absorber is then added and the coatings are adjusted to application viscosity with xylene. The coatings are at equal pigment to binder ratio throughout the evaluation of the white enamels (Examples B–L).

The substrate used in testing is Utithane 114 made by Ford Motor Company. It is a polyurethane reaction injection molding which is a polyol, isocyanate, catalyst mixture in liquid form which is injected in a plaque designed mold. The materials react rapidly in the mold to form a flexible substrate with high enough modulus to be used on automobile surfaces having flexible parts.

This polyurethane substrate is solvent wiped with a xylene/ethanol 50/50 blend and primed with a flexible black conductive primer manufactured by PPG Industries (DEL-33434). The primer is applied in three coats with a suction feed gun, (such as Bink's Model #62). The flash time between coats is one minute. Five minutes flash is used prior to baking in an air circulating oven at 121° C. for 20 minutes. Total dry film build-up of the primer is 0.8-1.0 mils.

White enamels A through L as listed in Table 6, are then applied on the primed polyurethane reaction injection molded plaques (4"×12"×⅛" plaques) in the following manner:

The white enamels are applied in three coats with a suction feed gun (Bink's Model #62). The flash time between coats is one minute; five minute flash is used prior to baking in an air circulating oven at 121° C. for 30 minutes. Total dry film build-up of the white enamel topcoats is 1.7-1.9 mils.

The paint compositions of Examples A-L are as follows:

| Example | Type of Product |
|---------|-----------------|
| A | Control - White - PPG DEM 8997 (a polyester-urethane cross-linked paint composition). |
| B | White - Standard butylated melamine acrylic topcoat paint composition; non-flexible. |
| C | White - A low glass transition temperature acrylic. More flexible than B but not flexible enough for plastic parts. |
| D | White - A low glass transition temperature acrylic. More flexible than B but not flexible enough for plastic parts. |
| E | White - Epsilon-caprolactone added with the acrylic monomers, flexible resin of the present invention. |
| F | White - Flexible resin of the present invention made with Union Carbide monomer TONE M 100. |
| G | White - Same as F but made with applicants' epsilon-caprolactone modified acrylic monomer. Similar to TONE M 100. |
| H | White - The epsilon-caprolactone is in the kettle at the start of this flexible resin preparation. |
| I | White - The preformed acrylic was reacted with epsilon-caprolactone. |
| J | White - Same as E but made in xylene. |
| K | White - Same as E and J but made in #100 aromatic solvent. |
| L | White - A high solid acrylic methylated melamine coating, non-flexible. |

After aging the coated panels for 72 hours, the films are subjected to the following tests:

A. Room temperature flexibility: a 1"×6" section of the coated panel is flexed 180° over a ½" mandrel and observations are made to determine if the film cracks to any noticeable degree, thus indicating failure.

B. Cold flexibility at −29° C.: a 1"×6" section of the coated panel is placed in a freezer for four hours and then flexed 180° over a ½" mandrel and observations are made determining if the film cracks to any noticeable degree, thus indicating a failure.

C. Room temperature flexibility after three months Florida exposure at 5° South:
   A 1"×6" section of the coated panel is flexed 180° over a ½" mandrel and observations were made determining if the film cracks to any noticeable degree, thus indicating a failure.

D. Cold flexibility at −29° C. after 3 months Florida exposure at 5° South in Florida: A 1"×6" section of the coated panel is placed in a freezer at −29° C. for four hours and then flexed in the freezer 180° over a ½" mandrel and observations are made determining if the film cracks to any noticeable degree, thus indicating failure.

E. Intercoat adhesion without sanding: a coated panel as prepared as previously indicated is re-coated white on white with the same white enamel in three coats with a suction feed gun and baked in an air circulating oven at 121° C. for 30 minutes. The re-coated dry film buildup is 1.7-1.9 mils. The initial coat is not sanded prior to the re-coat. A two inch "X" is made in the film to substrate with a knife edge and one leg of the "X" is masked with masking tape and the tape is pulled upward at a 90° angle in one rapid motion. The tape is observed for any portion of the re-coated enamel not adhering to the unsanded initial topcoats, thus indicating failure.

F. Solvent resistance (50 double methyl ethyl ketone rubs): A small quantity of methyl ethyl ketone is applied on the coating and the area is then rubbed with a double layer of cheesecloth wrapped around the index finger exerting as great an amount of pressure as possible. A double rub consists of a back and forth motion through a 1"-2" area. The number of double rubs are counted up to fifty unless the film solubilized and dissolved prior to fifty. The number of rubs are indicated.

G. Yellowing of film (after 100 hours QUV accelerated weathering −8/4 cycle): A 3"×6" section of the coated panel is subjected to QUV accelerated weathering (8 hours UV @71° C./4 hours humidity @49° C.) for 100 hours on a Q Panels Accelerated Weathering Tester. The panels are then checked for yellowing of the film and recorded. All test results are indicated in Table 11.

TABLE 6

| "ACRYLIC RESIN EXAMPLES" | | 3 | 4 | 5 | 13 | 16 | 15 | 9 | 17 | 11 | 12 | 1 |
|---|---|---|---|---|---|---|---|---|---|---|---|---|
| "WHITE ENAMEL EXAMPLES" | "A" | "B" | "C" | "D" | "E" | "F" | "G" | "H" | "I" | "J" | "K" | "L" |
| EPSILON-CAPROLACTONE MODIFIED ACRYLIC | | | | | 38.73 | 39.33 | 37.15 | 37.57 | 36.26 | 38.86 | 34.58 | |
| STANDARD ACRYLIC RESIN (LOW GLASS TRANSITION TEMPERATURE RESIN) | | | 35.35 | 35.92 | | | | | | | | |
| STANDARD ACRYLIC RESIN (HIGHER GLASS TRANSITION TEMPERATURE RESIN) | | 36.6 | | | | | | | | | | 29.23 |
| WHITE MILL PASTE (67% DISPERSED TITANIUM DIOXIDE, 21% ACRYLIC RESIN, 12% ORGANIC SOLVENT) | 3 28.0 | 13 26.57 | 13 28.50 | 13 27.94 | 13 29.38 | 13 27.69 | 13 28.47 | 13 27.60 | 13 27.13 | 13 25.57 | 1 28.75 |
| METHYLATED MELAMINE (CYMEL MELAMINE - AMERICAN CYANAMID) | | | 11.78 | 12.64 | 12.39 | 13.02 | 12.28 | 12.62 | 12.24 | 12.02 | | 18.04 |
| BUTYLATED MELAMINE RESIN (RESIN EXAMPLE #19) | 16.1 | | | | | | | | | | | 15.12 |

TABLE 6-continued

| "ACRYLIC RESIN EXAMPLES" | | 3 | 4 | 5 | 13 | 16 | 15 | 9 | 17 | 11 | 12 | 1 |
|---|---|---|---|---|---|---|---|---|---|---|---|---|
| "WHITE ENAMEL EXAMPLES" | "A" | "B" | "C" | "D" | "E" | "F" | "G" | "H" | "I" | "J" | "K" | "L" |
| BLOCKED ACID CATALYST (X-4910 DINONYLNAPHTHALENE DISULFONIC ACID - KING INDUSTRIES) | | | 0.88 | 0.95 | 0.93 | 0.97 | 0.92 | 0.94 | 0.92 | 0.90 | | 1.30 |
| FLOW ADDITIVE, POLYBUTYL ACRYLATE (A-620-A2, COOK P & V CO.) | | 0.1 | 0.17 | 0.19 | 0.18 | 0.19 | 0.18 | 0.19 | 0.18 | 0.18 | 0.17 | 0.20 |
| ACRYLIC MICROGEL RESIN (RESIN EXAMPLE #18) | | 6.1 | 6.54 | 7.02 | 6.88 | 7.24 | 6.82 | 7.01 | 6.80 | 6.68 | 6.30 | 10.06 |
| XYLENE | | 6.46 | 12.97 | 6.61 | 6.90 | 3.48 | 8.98 | 7.06 | 10.03 | 10.35 | 12.75 | 6.31 |
| UV ABSORBER (TINUVIN 328 CIBA-GEIGY) | | 0.64 | 0.76 | 0.82 | 0.80 | 0.88 | 0.78 | 0.79 | 0.79 | 0.78 | 0.71 | 0.75 |
| ETHANOL | | 2.0 | 1.47 | 1.57 | 1.54 | 1.62 | 1.53 | 1.57 | 1.52 | 1.50 | 1.41 | 1.50 |
| n-BUTANOL | | 4.0 | 3.51 | 3.78 | 3.71 | 3.89 | 3.67 | 3.78 | 3.66 | 1.60 | 3.39 | 3.86 |
| VISCOSITY #4 FORD AT 80° F. | 18" | 20" | 17" | 20" | 20" | 20" | 20" | 20" | 20" | 20" | 20" | 20" |
| NON-VOLATILES AT APPLICATION % BY WEIGHT | 32.1 | 49.87 | 57.06 | 62.09 | 60.68 | 60.92 | 58.79 | 59.17 | 59.89 | 59.20 | 53.84 | 56.65 |

EXAMPLES M-P

Paint Preparation, Application, and Evaluation

Silver Metallic Enamels

The silver metallics pigmented coatings are prepared using the ingredients listed in Table 7 (formulations N-P) which are at application viscosity (18"-20"-#4 Ford Cup at 80° F.).

The acrylic resin, aluminum slurry, flow additive and melamine resin are blended together with thorough agitation in a high speed mixer. Added to the above ingredients with rapid agitation is the microgel resin—Example #18.

The blocked acid catalyst is pre-blended with the indicated amounts of ethanol and n-butanol and added with rapid agitation to the accumulated ingredients. If blocked acid catalyst is not indicated, the ethanol and n-butanol quantities are added and, in both instances, the U.V. absorber is then added and the coatings are adjusted to application viscosity with xylene. The coatings are at equal pigment to binder ratio throughout the evaluation of the silver metallic enamels, Examples N-P.

The substrate used in testing is Utithane 114 made by Ford Motor Company. It is a polyurethane reaction injection molding which is a polyol, isocyanate, catalyst mixture in liquid form which is injected in a plaque designed mold. The materials react rapidly in the mold to form a flexible substrate with high enough modulus to be used on automobile surfaces having flexible parts.

This polyurethane substrate is solvent wiped with a xylene/ethanol//50/50 blend and primed with a flexible black conductive primer manufactured by PPG Industries, DEL-33434. The primer is applied in three coats with a suction feed gun, such as Bink's Model #62. The flash time between coats is one minute. Five minute flash is used prior to baking in an air circulating oven at 121° C. for 20 minutes. Total dry film build-up of the primer is 0.8-1.0 mils.

The silver metallic enamels M through P, as listed in Table 7, and prepared as previously indicated are then applied on the primed polyurethane reaction injection molded plaques (4"×12"×⅛" plaques) in the following manner:

The silver metallic enamels are applied in three coats with a suction feed gun (Bink's Model #62). The flash time between coats is one minute and a five minute flash is used prior to baking in an air circulating oven at 121° C. for 30 minutes. The total dry film build-up of the silver metallic enamel topcoats is 1.7-1.9 mils.

The paint compositions of Examples M-P are as follows:

| Example | Type of Product |
|---|---|
| M | Control - One Coat Silver Metallic PPG DSM-8310 - a polyester urethane melamine cured composition, |
| N | One Coat Silver Metallic A high solids acrylic methylated melamine, non-flexible - standard high solids, |
| O | One Coat Silver Metallic The epsilon-caprolactone is in the kettle at the start of this flexible resin preparation. |
| P | One Coat Silver Metallic This flexible resin was made with an epsilon-caprolactone modified acrylic monomer made by applicants. |

After aging the coated panels for 72 hours, the films are subjected to the following tests:

A. Room temperature flexibility: A 1"×6" section of the coated panel is flexed 180° over a ½" mandrel and observations are made determining if the film cracks to any noticeable degree, thus indicating failure.

B. Cold flexibility at −29° C.: A 1"×6" section of the coated panel is placed in a freezer for four hours and then flexed 180° over a ½" mandrel and observations are made determining if the film cracks to any noticeable degree, thus indicating a failure.

C. Room temperature flexibility after three months Florida exposure at 5° South:

A 1"×6" section of the coated panel is flexed 180° over a ½" mandrel and observations were made determining if the film cracks to any noticeable degree, thus indicating a failure.

D. Cold flexibility at −29° C. after 3 months Florida exposure at 5° South in Florida: A 1"×6" section of the coated panel is placed in a freezer at −29° C. for four hours and then flexed in the freezer 180° over a ½" mandrel and observations are made determining if the film cracks to any noticeable degree, thus indicating failure.

E. Intercoat adhesion without sanding: A coated panel as prepared as previously indicated is recoated silver metallic on silver metallic with the same silver metallic enamel in three coats with a suction feed gun and baked in an air circulating oven at 121° C. for 30 minutes. The recoated dry film build-up is 1.7-1.9 mils. The initial coat is not sanded prior to the recoat. A two inch "X" is made in the film to substrate with a knife edge and one leg of the "X" is masked with masking tape and the tape is pulled upward at a 90° angle in one rapid motion. The tape is observed for any portion of the recoated enamel not adhering to the unsanded initial topcoats, thus indicating failure.

F. Solvent resistance (50 double methyl ethyl ketone rubs): A small quantity of methyl ethyl ketone is applied on the coating and the area is then rubbed with a double layer of cheesecloth wrapped around the index finger exerting as great an amount of pressure as possible. A double rub consists of a back and forth motion through a 1"-2" area. The number of double rubs are counted up to fifty unless the film solubilized and dissolved prior to fifty. The number of rubs are indicated.

G. Yellowing of the film (after 100 hours QUV accelerated weathering—8/4 cycle): A 3"×6" section of the coated panel is subjected to QUV accelerated weathering (8 hours UV @71° C./4 hours humidity @49° C.) for 100 hours on a Q Panels Accelerated Weathering Tester. The panels are then checked for yellowing of the film and recorded. All test results are indicated in Table 11.

TABLE 7

| "ACRYLIC RESIN EXAMPLES" | 1 | 8 | 14 | |
|---|---|---|---|---|
| SILVER METALLIC ENAMEL EXAMPLE | "M" | "N" | "O" | "P" |
| EPSILON-CAPROLACTONE MODIFIED ACRYLIC RESIN | | | 45.83 | 36.76 |
| STANDARD ACRYLIC RESIN (HIGHER GLASS TRANSITION TEMPERATURE RESIN) | | 46.94 | | |
| ALUMINUM SLURRY (1 PART ALUMINUM PASTE ALCOA 7574 AND 1 PART XYLENE) | | 4.86 | 3.94 | 3.94 |
| METHYLATED MELAMINE RESIN (CYMEL 303 HEXA-METHOXY METHYL MELAMINE - AMERICAN CYANAMID) | | 15.10 | 15.00 | 15.00 |
| BLOCKED ACID CATALYST (X-4910 DINONYLNAPHTHALENE DISULFONIC ACID - KING INDUSTRIES) | | 0.50 | 0.90 | 0.90 |
| FLOW ADDITIVE, POLYBUTYL ACRYLATE (A-620-A2 COOK P & V COMPANY) | | 0.1 | 0.20 | 0.20 |
| ACRYLIC MICROGEL RESIN (RESIN EXAMPLE #18) | | 26.74 | 22.73 | 22.73 |
| XYLENE | | 1.01 | 5.30 | 14.37 |
| UV ABSORBER (TINUVIN 328 CIBA-GEIGY) | | 1.57 | 1.00 | 1.00 |
| ETHANOL | | 1.17 | 1.50 | 1.50 |
| n-BUTANOL | | 2.01 | 3.60 | 3.60 |
| VISCOSITY #4 FORD AT 80° F. | 18" | 20" | 20" | 20" |
| NON-VOLATILES AT APPLICATION % BY WEIGHT | 25.13 | 48.60 | 48.52 | 46.93 |

EXAMPLES Q-W and AA–GG

Paint Preparation, Application, and Evaluation

Basecoat/Clearcoat Silver Metallic Enamels

A. The silver metallic pigmented basecoats are prepared using the ingredients listed in Table 8 (formulations U-W), which are at application viscosity (15" #4 Ford Cup at 80° F.).

The acrylic resin, aluminum paste, cellulose acetate butyrate and melamines are blended together with thorough agitation in a high speed mixer for about 30 minutes. Added to the above ingredients with rapid agitation is microgel resin, Example #18. The blocked acid catalyst is preblended with the methyl amyl ketone and xylene and added with rapid agitation to the accumulated ingredients. The coatings are at equal pigment to binder ratios throughout the evaluation of the silver metallic basecoats.

B. The clearcoats are prepared using the ingredients listed in Table 9 (formulations R-S) which are at application viscosity (20"#4 Ford Cup at 80° F.). The acrylic resin, flow additive, ultra violet absorber and melamine resin are blended together with thorough agitation in a high speed mixer. The blocked acid catalyst is preblended with the indicated amounts of ethanol and butanol and is added with rapid agitation to the accumulated ingredients. The coatings are adjusted to application viscosity with xylene.

The paint compositions of Examples Q-W are as follows:

| Example | Type of Product |
|---|---|
| Q | Control - Clear Coat - PPG , ECC 1000 - a urethane polyester melamine cured composition, |
| R | Clear Coat A flexible acrylic where epsilon-caprolactone is added with the acrylic monomers, |
| S | Clear Coat A high solids acrylic for hard clear coats, |
| T | Control - Silver Metallic Basecoats PPG - EBC 33528 - a polyester urethane melamine cured composition, |
| U | Silver Metallic Basecoat (Hard) A high solids acrylic basecoat for hard non-flexible objects. |
| V | Silver Metallic Basecoat (flexible) A flexible acrylic where the epsilon-caprolactone is added with the monomers, |
| W | Silver Metallic Basecoat (flexible) The epsilon-caprolactone is present in the reactor at the start of the flexible acrylic preparation. |

The substrate used in testing is Utithane 114 made by Ford Motor Company. It is a polyurethane reaction injection molding which is a polyol, isocyanate, catalyst mixture in liquid form which is injected in a plaque designed mold. The materials react rapidly in the mold to form a flexible substrate with high enough modulus to be used in automobiles as flexible parts.

The polyurethane substrate is solvent wiped with a xylene/ethanol//50/50 blend and primed with a flexible black conductive primer manufactured by PPG Industries, DEL-33434. The primer is applied in three coats with a suction feed gun (Bink's Model #62). The flash time between coats is one minute and five minute flash is used prior to baking in an air circulating oven at 121° C. for 20 minutes. Total dry film build-up of the primer is 0.8–1.0 mils.

The silver metallic basecoats (T-W) and the clearcoat enamels (Q-S) as listed in Tables 8 and 9 are then applied on the primed polyurethane reaction injection molded plaques (4"×12"×⅛" plaques) in the following manner:

The silver metallic basecoats are applied in two coats with a suction feed gun (Bink's Model #62). The flash time between coats is one minute. A three minute flash is allowed prior to applying the clearcoats in two coats with a one minute flash between coats. A five minute flash is used prior to baking in an air circulating oven at 121° C. for 30 minutes. Dry film build-up of the combined coatings is 0.5-0.7 mils of silver metallic basecoat and 1.5-1.7 mils of clearcoat enamel for a combined film build-up range of 2.0-2.4 mils total topcoat.

The following chart indicates the above coated on articles AA through GG.

| Coated Article | Basecoat | Clearcoat |
|---|---|---|
| AA | U | R |
| BB | U | S |
| CC | V | R |
| DD | V | S |
| EE | W | R |
| FF | W | S |
| GG | T | Q |

After aging the coated panels for 72 hours, the films are subjected to the following tests:

A. Room temperature flexibility: A 1"×6" section of the coated panel is flexed 180° over a ½" mandrel and observations are made determining if the film cracks to any noticeable degree, thus indicating failure.

B. Cold flexibility at −29° C.: A 1"×6" section of the coated panel is placed in a freezer at −29° C. for four hours and then flexed 180° over a ½" mandrel and observations are made determining if the film cracks to any noticeable degree, thus indicating a failure.

C. Room temperature flexibility after three months Florida exposure at 5° South: A 1"×6" section of the coated panel is flexed 180° over a ½" mandrel and observations were made determining if if the film cracks to any noticeable degree, thus indicating a failure.

D. Cold flexibility at −29° C. after 3 months Florida exposure at 5° South in Florida: A 1"×6" section of the coated panel is placed in a freezer at −29° C. for four hours and then flexed in the freezer 180° over a ½" mandrel and observations are made determining if the film cracks to any noticeable degree, thus indicating failure.

E. Intercoat adhesion without sanding—a coated panel as prepared as previously indicated is re-coated silver metallic basecoat/clearcoat on silver metallic basecoat/clearcoat with the same silver metallic basecoat/clearcoat enamels as before with a suction feed gun and baked in an air circulating oven at 121° C. for 30 minutes. The recoated dry film build-up is 2.0-2.4 mils. The initial coat is not sanded prior to the recoat. A two inch "X" is made in the film to substrate with a knife edge and one leg of the "X" is masked with masking tape and the tape is pulled upward at a 90° angle in one rapid motion. The tape is observed for any portion of the recoated enamel not adhering to the unsanded initial top-coats, thus indicating failure.

F. Solvent resistance (50 double methyl ethyl ketone rubs): A small quantity of methyl ethyl ketone is applied on the coating and the area is then rubbed with a double layer of cheesecloth wrapped around the index finger, exerting as great an amount of pressure as possible. A double rub consists of a back and forth motion through a 1"-2" area. The number of double rubs are counted up to fifty unless the film solubilized and dissolved prior to fifty. The number of rubs is indicated.

G. Yellowing of the film (after 100 hours QUV accelerated weathering—8/4 cycle): A 3"×6" section of the coated panel is subjected to QUV accelerated weathering (8 hours UV@71° C./4 hours humidity@49° C.) for 100 hours on a Q Panels Accelerated Weathering Tester. The panels are then checked for yellowing of the film and recorded. All test results are indicated in Table 11.

TABLE 8

| "ACRYLIC RESIN EXAMPLES" | 2 | 10 | 7 |
|---|---|---|---|
| "SILVER METALLIC BASECOAT" | | | |
| "EXAMPLE" | "T" | "U" | "V" | "W" |
| EPSILON-CAPROLACTONE MODIFIED ACRYLIC | | | 25.18 | 28.23 |
| STANDARD ACRYLIC RESIN | 20.01 | | | |
| ACRYLIC MICROGEL RESIN (RESIN EXAMPLE #18) | 41.20 | 28.80 | 28.63 |
| CELLULOSE ACETATE BUTYRATE (CAB-551-0.2) EASTMAN CHEMICAL | 1.77 | 1.73 | 1.75 |
| METHYLATED MELAMINE RESIN (CYMEL 303 HEXA-METHOXY METHYL MELAMINE - AMERICAN CYANAMID) | 13.54 | 6.90 | 6.86 |
| BLOCKED ACID CATALYST (X-4910 DINONYLNAPHTHALENE DISULFONIC ACID, KING INDUSTRIES) | 0.42 | 0.52 | 0.52 |
| ALUMINUM PASTE (ALCOA 7575 - 65% N.V. IN MINERAL SPIRITS | | 10.00 | 6.37 | 6.33 |
| XYLENE | | 10.48 | 19.91 | 16.27 |
| METHYL AMYL KETONE | | 2.58 | 10.59 | 11.41 |
| VISCOSITY #4 FORD @ 80° F. | 19" | 15" | 15" | 15" |
| NON-VOLATILES AT APPLICATION % BY WEIGHT | 23.27 | 38.42 | 37.98 | 37.82 |

TABLE 9

| "ACRYLIC RESIN EXAMPLES" | 13 | 6 |
|---|---|---|
| "CLEARCOAT EXAMPLES" | "Q" | "R" | "S" |
| EPSILON-CAPROLACTONE MODIFIED ACRYLIC | | 63.88 | |
| STANDARD ACRYLIC RESIN | | | 54.36 |
| UV ABSORBER (TINUVIN 328 - CIBA GEIGY) | | 2.94 | 1.87 |
| METHYLATED MELAMINE RESIN (CYMEL 303 - HEXAMETHOXY METHYL MELAMINE - AMERICAN CYANAMID) | | 16.84 | 18.28 |
| BLOCKED ACID CATALYST (X-4910 DINONYLNAPHTHALENE DISULFONIC ACID - KING INDUSTRIES) | | 1.41 | 1.33 |
| XYLENE | | 7.58 | 15.60 |
| ETHANOL | | 2.05 | 3.21 |
| n-BUTANOL | | 5.10 | 5.15 |
| FLOW ADDITIVE, POLYBUTYL ACRYLATE (A-620-A2, COOK P & V CO.) | | 0.20 | 0.20 |
| VISCOSITY #4 FORD @ 80° F. | 14" | 20" | 20" |
| NON-VOLATILES AT APPLICATION % BY WEIGHT | 27.28 | 48.11 | 51.59 |

Paint Examples X, Y, Z, and HH-KK

Primer Preparation, Application and Evaluation

Black Conductive Primers

The black conductive primers are prepared using the ingredients listed in Table 10 (formulations Y and Z) which are at application viscosity (15"-18" #4 Ford Cup at 80° F.).

The black conductive primers of Examples X-Z are as follows:

| Example | Type of Product |
|---|---|
| X | Black Conductive Primer - PPG - DEL 33434 - An aromatic urethane lacquer conductive primer (conductive when on substrate dry or wet) |
| Y | Black Conductive Primer Flexible acrylic with epsilon-caprolactone added with monomers. |
| Z | Black Conductive Primer Like Y but 2 flexible resins used together. |

The acrylic resin, lecithin wetting agent, carbon black, graphite and silica are added together in a steel ball mill and rolled for about 24 hours grinding the pigment particles to a fine particle size suitable for primers. The above ground paste is transferred out of the mill to a tank equipped with a high speed mixer. To the above paste is added with rapid agitation the melamine resin and flow agent. The blocked acid catalyst is preblended with the indicated quantities of ethanol and butanol and is added to the combined ingredients with rapid agitation. The primer is then adjusted to application viscosity with #100 aromatic solvent.

The substrate used for testing is Utithane 114 made by Ford Motor Company. It is a polyurethane reaction injection molding which is a polyol isocyanate, catalyst mixture in liquid form which is injected in a plaque designed mold. The materials react rapidly in the mold to form a flexible substrate with high enough modulus to be used on automobiles as flexible parts.

The polyurethane substrate is solvent wiped with a xylene/ethanol//50/50 blend and is primed in the following manner: The black conductive primer X is applied in three coats and primers Y and Z are applied in two coats, with a suction feed gun (such as Bink's Model #62). The flash between coats is one minute and a five minute flash is used prior to baking in an air circulating oven at 121° C. for 20 minutes. Total dry film build-up of the black conductive primers is 0.8-1.0 mil.

The primers X, Y, and Z were evaluated as primers only.

The primers were also evaluated with white enamel topcoats. The white enamels A & E as listed in Table 6 and prepared as previously indicated are then applied on the primed (with X, Y, and Z) polyurethane reaction injection molded plaques (4"×12"×⅛" plaques) in the following manner:

The white enamels A & E are applied in three coats with a suction feed gun (Bink's Model #62). The flash time between coats is one minute and a five minute flash is used prior to baking in an air circulating oven at 121° C. for 30 minutes. Total dry film build-up of the white enamels A & E is 1.7-1.9 mils.

The following chart specifies coated articles HH, II, JJ, KK, A and E.

| Coated Article | Primer | White Topcoat |
|---|---|---|
| HH | Y | A |
| II | Y | E |
| JJ | Z | A |
| KK | Z | E |
| A (*) | X | A |
| E (*) | X | E |

(*) Previously reported

After aging the coated panels for 72 hours, the films are subjected to the following tests:

A. Room temperature flexibility: A 1'×6" section of the coated panels is flexed 180° over a ½" mandrel and observations were made determining if the film cracks to any noticeable degree, thus indicating failure.

B. Cold flexibility at −29° C.: A 1"×6" section of the coated panel is placed in a freezer at −29° C. for four hours and then flexed 180° over a ½" mandrel and observations are made determining if the film cracks to any noticeable degree, thus indicating a failure.

C. Room temperature flexibility after three months Florida exposure at 5° South:
A 1"×6" section of the coated panel is flexed 180° over a ½" mandrel and observations were made determining if the film cracks to any noticeable degree, thus indicating a failure.

D. Cold flexibility at −29° C. after 3 months Florida exposure at 5° South in Florida: A 1'×6" section of the coated panel is placed in a freezer at −29° C. for four hours and then flexed in the freezer to an angle of 180° over a ½" mandrel and observations are made determining if the film cracks to any noticeable degree, thus indicating failure.

E. Intercoat adhesion without sanding: A coated panel as prepared as previously indicated is recoated primer-on-primer with the same primer enamel in three coats with a suction feed gun and baked in an air circulating oven at 121° C. for 30 minutes. The recoated dry film build-up is 0.8-1.0 mils. The initial coat is not sanded prior to the recoat. A two inch "X" is made in the film to substrate with a knife edge and one leg of the "X" is masked with masking tape and the tape is pulled upward at a 90° angle in one rapid motion. The tape is observed for any portion of the recoated enamel not adhering to the unsanded initial topcoats, thus indicating failure.

F. Solvent resistance (50 double methyl ethyl ketone rubs): A small quantity of methyl ethyl ketone is applied on the coating and the area is then rubbed with a double layer of cheesecloth wrapped around the index finger exerting as great an amount of pressure as possible. A double rub consists of a back and forth motion through a 1"-2" area. The number of double rubs are counted up to fifty unless the film solubilized and dissolved prior to fifty. The number of rubs are indicated.

G. Yellowing of film (after 100 hours QUV accelerated weathering—8/4 cycle): A 3"×6" section of the coated panel is subjected to QUV accelerated weathering (8 hours UV @ 71° C./4 hours humidity @ 49° C.) for 100 hours on a Q panels accelerated Weathering Tester. The panels are then checked for yellowing of the film and recorded. All test results are indicated in Table 11.

TABLE 10

| CONDUCTIVE PRIMER EXAMPLES | "X" | "Y" | "Z" |
|---|---|---|---|
| EPSILON-CAPROLACTONE MODIFIED | | 37.05 | 25.93 |

TABLE 10-continued

| CONDUCTIVE PRIMER EXAMPLES | "X" | "Y" | "Z" |
|---|---|---|---|
| ACRYLIC (RESIN EXAMPLE #10) | | | |
| EPSILON-CAPROLACTONE MODIFIED ACRYLIC (RESIN EXAMPLE #13) | | | 11.12 |
| % BY WEIGHT | | | |

TABLE 11

| Coated Article | Room Temperature Flexibility | Cold Flexibility @ -29° C. | After 3 months Florida exposure R.T. Flex. | After 3 months Florida exposure -29° C. Flex. | I.A. w/o sanding | 50 double mek rubs solvent resist. | Yellowing after 100 hrs. QUV 8/4 cycle |
|---|---|---|---|---|---|---|---|
| WHITE | ENAMEL | EVALUATION | A-L | | | | |
| Control A | P | F | P | F | P | 50 | OK |
| B | F | F | F | F | P | 50 | OK |
| C | P | F | P | F | P | 50 | OK |
| D | P | F | P | F | P | 50 | OK |
| E | P | P | P | P | P | 50 | OK |
| F | P | P | P | P | P | 50 | OK |
| G | P | P | P | P | P | 50 | OK |
| H | P | P | P | P | P | 50 | OK |
| I | P | P | P | P | P | 50 | OK |
| J | P | P | P | P | P | 50 | OK |
| K | P | P | P | P | P | 50 | OK |
| L | F | F | F | F | P | 50 | OK |
| SILVER | METALLIC | EVALUATION | M-P | | | | |
| Control M | P | P | P | F | F | 50 | OK |
| N | P | F | P | F | P | 30 | OK |
| O | P | P | P | P | P | 50 | OK |
| P | P | P | P | P | P | 50 | OK |
| BASECOAT/CLEARCOAT | EVALUATION | AA-GG | | | | | |
| Control AA | P | F | P | F | P | 50 | OK |
| BB | F | F | F | F | P | 50 | OK |
| CC | P | P | P | P | P | 50 | Slight |
| DD | F | F | F | F | P | 50 | OK |
| EE | P | P | P | P | P | 50 | OK |
| FF | F | F | F | F | P | 50 | OK |
| Control GG | P | P | P | F | F | 50 | Severe |
| PRIMER | EVALUATION | X-Z | | | | | |
| Control X | P | P | P | P | P | 3 | n/a |
| Y | P | P | P | P | P | 50 | n/a |
| Z | P | P | P | P | P | 50 | n/a |
| PRIMER | EVALUATION | W/ A & E | WHITE | ENAMEL | TOPCOATS | | |
| HH | P | F | P | F | NA | 50 | n/a |
| II | P | P | P | P | NA | 50 | n/a |
| JJ | P | F | P | F | NA | 50 | n/a |
| KK | P | P | P | P | NA | 50 | n/a |
| Control A | P | F | P | F | NA | 50 | n/a |
| E | P | P | P | P | NA | 50 | n/a |

| | | |
|---|---|---|
| WETTING AGENT, LECITHINE (KELACIN FD, SPENCER-KELLOGG) | 0.07 | 0.07 |
| CARBON BLACK (CONDUCTEX 975 COLUMBIA CHEMICAL) | 1.19 | 1.19 |
| GRAPHITE (#470 MICRO-ASBURY GRAPHITE MILLS, INC.) | 2.60 | 2.60 |
| SILICA (SILCRON, G-600-GLIDDEN) | 3.71 | 3.71 |
| METHYLATED MELAMINE RESIN (CYMEL 303 HEXAMETHOXY METHYL MELAMINE - AMERICAN CYANAMID) | 11.17 | 11.17 |
| FLOW AGENT, POLYBUTYL ACRYLATE (A-620-A2 COOK P & V CO.) | 0.18 | 0.18 |
| BLOCKED ACID CATALYST (X-4910 DINONYLNAPHTHALENE DISULFONIC ACID - KING INDUSTRIES) | 0.92 | 0.92 |
| #100 AROMATIC SOLVENT | 26.04 | 26.04 |
| n-BUTANOL | 12.78 | 12.78 |
| ETHANOL | 4.29 | 4.29 |
| VISCOSITY #4 FORD AT 80° F. | 15" 18" | 18" |
| NON-VOLATILE AT APPLICATION | 18.12 45.40 | 45.51 |

What we claim is:

1. A method of coating a continuous substrate having plastic and metal sections with a flexible coating comprising:
   (a) applying to said substrate a coating composition comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer; and
   (b) curing said coating to said substrate.

2. The method of claim 1, wherein said epsilon-caprolactone modified acrylic polymer further contains about 0.1 to 4.0% by weight carboxyl contents and said epsilon-caprolactone concentration is about 0.25 to 6 moles epsilon-caprolactone per mole of hydroxyl and carboxyl in the polymer.

3. The method of claim 2, wherein step (b) is carried out at a temperature of about 82° to 193° C.

4. The method of claim 3, wherein said coating composition further comprises about 0.5 to 35% by weight of an acrylic microgel resin.

5. The method of claim 3, wherein said coating composition further comprises about 1.0 to 10% by weight of cellulose acetate butyrate resin.

6. The method of claim 3, wherein said coating composition has a solids content of about 35 to 68% and a liquid carrier of about 32 to 65% by weight.

7. The method of claim 3, wherein said epsilon-caprolactone modified acrylic polymer is prepared from about 0.2 to 9% by weight carboxyl functional monomers, about 1 to 48% by weight hydroxyl functional monomers with the remainder being other ethylenically unsaturated monomers and about 5 to 55% by weight of epsilon-caprolactone monomer.

8. The method of claim 6, further comprising about 0.5 to 150% by weight pigments based on the solids content.

9. The method of claim 3, wherein said aminoplast resin cross-linking agent is selected from the group consisting of aldehyde condensation products of melamine, urea, and benzoguanamine.

10. The method of claim 9, wherein said epsilon-caprolactone polymer is composed of epsilon-caprolactone and at least two ethylenically unsaturated monomers at least one having said hydroxyl or carboxyl contents and the other having no hydroxyl or no carboxyl contents.

11. The method of claim 10, wherein said ethylenically unsaturated monomers having hydroxyl contents are selected from the group consisting of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, and 4-hydroxybutyl methacrylate.

12. The method of claim 11, wherein said ethylenically unsaturated monomers having carboxyl contents are selected from the group consisting of acrylic acid, methacrylic acid, itaconic acid, maleic acid, fumaric acid, and crotonic acid.

13. A method of coating a continuous substrate having plastic and metal sections with a plurality of flexible coatings comprising:
(a) applying to said substrate a first coating composition comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000 hydroxyl contents from about 1 to 7% by weight, and about 0.25 to 6 moles of epsilon-caprolactone per mole of hydroxyl in the polymer, said coating composition having a solids content of about 35 to 68% by weight and a liquid carrier of about 32 to 65% by weight and further comprising about 0.5 to 150% by weight pigments based on said solids content;
(b) flashing off said liquid carrier to form a pigmented layer;
(c) applying wet-on-wet a second coating composition comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer, said coating composition having a solids content of about 35 to 68% and a liquid carrier of about 32, to 65% by weight; and
(d) curing said multiple coating to said substrate.

14. The method of claim 13, wherein said epsilon-caprolactone modified acrylic polymer of steps (a) and (c) further contain about 0.1 to 4.0% by weight carboxyl contents and said epsilon-caprolactone concentration is about 0.25 to 6 moles epsilon-caprolactone per mole of hydroxyl and carboxyl in the polymer.

15. The method of claim 14, wherein step (d) is carried out at a temperature of about 82° to 193° C.

16. The method of claim 15, wherein said first and second coating compositions further comprise about 0.5 to 35% by weight of an acrylic microgel resin.

17. The method of claim 15, wherein said first and second compositions further comprise about 1.0 to 10% by weight of cellulose acetate butyrate resin.

18. The method of claim 15, wherein said epsilon-caprolactone modified acrylic polymer of steps (a) and (c) is prepared from about 0.2 to 9% by weight carboxyl functional monomers, about 1 to 48% by weight hydroxyl functional monomers with the remainder being other ethylenically unsaturated monomers, and about 5 to 55% by weight of epsilon-caprolactone monomer.

19. A method of coating a continuous substrate having plastic and metal sections with a plurality of flexible coatings comprising:
(a) applying to said substrate a first coating composition comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer, said coating composition having a solids content of about 35 to 68% by weight and a liquid carrier of about 32 to 65% by weight and further comprising about 10 to 40% by weight of pigment having electrically conductive properties based on said solids content;
(b) flashing off said liquid carrier and curing at 82°-193° C. to form an electrically conductive primer layer;
(c) applying a second coating composition comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer, said coating Composition having a solids content of about 35 to 68% by weight and a liquid carrier of about 32 to 65% by weight and further comprising about 0.5 to 150% by weight pigments based on said solids content;

(d) flashing off said liquid carrier of (c) to form a pigmented base coat layer;

(e) applying wet-on-wet a third coating composition comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer, said coating composition having a solids content of about 35 to 68% by weight, and a liquid carrier of about 32 to 65% by weight; and (f) curing said multiple coating to said substrate.

20. The method of claim 19, wherein said epsilon-caprolactone modified acrylic polymer of steps (a), (c) and (e) further contain about 0.1 to 4.0% by weight carboxyl contents and said epsilon-caprolactone concentration is about 0.25 to 6 moles epsilon-caprolactone per mole of hydroxyl and carboxyl in the polymer.

21. The method of claim 20, wherein step (f) is carried out at a temperature of about 82° to 193° C.

22. The method of claim 21, wherein said second and third coating compositions further comprise about 0.5 to 35% by weight of an acrylic microgel resin.

23. The method of claim 21, wherein said second coating composition further comprises about 1.0 to 10% by weight of cellulose acetate butyrate resin.

24. A coated article comprising:
(a) a continuous substrate having plastic and metal sections; and
(b) a top coat layer applied to said substrate having a thickness of about 1.4 to 2.2 mils and comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer and about 0.5 to 150% by weight of pigments based on the weight of said polymer.

25. The coated article of claim 24, wherein said epsilon-caprolactone modified acrylic polymer further contains about 0.1 to 4.0% by weight carboxyl contents and said epsilon-caprolactone concentration is about 0.25 to 6 moles epsilon-caprolactone per mole of hydroxyl and carboxyl in the polymer.

26. The coated article of claim 25, wherein said modified acrylic polymer further comprises about 0.5 to 35% by weight of an acrylic microgel resin.

27. The coated article of claim 26, wherein said modified acrylic polymer further comprises about 1.0 to 10% by weight of cellulose acetate butyrate resin.

28. A coated article comprising:
(a) a continuous substrate having plastic and metal sections;
(b) a base coat layer applied to said substrate having a thickness of about 0.4 to 1.5 mils and comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer and about 0.5 to 150% by weight of pigments based on the weight of said polymer; and
(c) a clear top coat layer applied to said base coat layer having a thickness of about 0.8 to 2.5 mils and comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer.

29. The coated article of claim 28, wherein said epsilon-caprolactone modified acrylic polymer of (b) and (c) further contains about 0.1 to 4.0% by weight carboxyl contents and said epsilon-caprolactone concentration is about 0.25 to 6 moles epsilon-caprolactone per mole of hydroxyl and carboxyl in the polymer.

30. The coated article of claim 29, wherein said modified acrylic polymer of (b) further comprises about 0.5 to 35% by weight of an acrylic microgel resin.

31. The coated article of claim 30, wherein said modified acrylic polymer of (b) further comprises about 1.0 to 10% by weight of cellulose acetate butyrate resin.

32. A coated article comprising:
(a) a continuous substrate having plastic and metal sections;
(b) a primer coat layer applied to said substrate having a thickness of about 0.6 to 1.0 mils and comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer and about 10 to 40% by weight of pigment having electrically conductive properties based on the weight of said polymer;
(c) a base coat layer applied to said primer coat layer having a thickness of about 0.4 to 1.5 mils and comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer and about 0.5 to 150% by weight of pigments based on the weight of said polymer; and
(d) a clear top coat layer applied to said base coat layer having a thickness of about 0.8 to 2.5 mils and comprising about 40 to 95% by weight of an epsilon-caprolactone modified acrylic polymer and about 5 to 45% by weight of an aminoplast resin cross-linking agent, said epsilon-caprolactone modified acrylic polymer having a number average molecular weight of about 1,000 to 6,000, hydroxyl contents from about 1 to 7% by weight, and about 0.25 to 6 moles of epsilon-caprolactone per mole of hydroxyl in the polymer.

33. The coated article of claim 32, wherein said epsilon-caprolactone modified acrylic polymer of steps (b), (c), and (d) further contains about 0.1 to 4.0% by weight carboxyl contents and said epsilon-caprolactone concentration is about 0.25 to 6 moles epsilon-caprolactone per mole of hydroxyl and carboxyl in the polymer.

34. The coated article of claim 33, wherein said modified acrylic polymer of steps (c) and (d) further comprises about 0.5 to 35% by weight of an acrylic microgel resin.

35. The coated article of claim 34, wherein said modified acrylic polymer of step (c) further comprises about 1.0 to 10% by weight of cellulose acetate butyrate resin.

* * * * *